United States Patent
Abe et al.

(10) Patent No.: US 8,814,262 B2
(45) Date of Patent: Aug. 26, 2014

(54) VEHICLE SEAT HEATER

(75) Inventors: Norio Abe, Shiga (JP); Yoshimitsu Fujiwara, Shiga (JP); Kazuaki Hioki, Shiga (JP); Masanori Nishikawa, Shiga (JP); Kazumi Nagayama, Shiga (JP)

(73) Assignee: Panasonic Corporation, Osaka (JP)

( * ) Notice: Subject to any disclaimer, the term of this patent is extended or adjusted under 35 U.S.C. 154(b) by 261 days.

(21) Appl. No.: 13/259,520

(22) PCT Filed: Mar. 7, 2011

(86) PCT No.: PCT/JP2011/001331
§ 371 (c)(1),
(2), (4) Date: Feb. 10, 2012

(87) PCT Pub. No.: WO2012/120558
PCT Pub. Date: Sep. 13, 2012

(65) Prior Publication Data
US 2012/0228903 A1    Sep. 13, 2012

(51) Int. Cl.
*A47C 7/74*  (2006.01)
*B60N 2/58*  (2006.01)
*B60N 2/56*  (2006.01)
*H05B 3/34*  (2006.01)

(52) U.S. Cl.
CPC ............ *A47C 7/74* (2013.01); *H05B 2203/014* (2013.01); *H05B 2203/029* (2013.01); *B60N 2/5825* (2013.01); *B60N 2/5685* (2013.01); *H05B 3/34* (2013.01); *H05B 2203/003* (2013.01)
USPC ............... 297/180.12; 297/180.11; 297/217.3

(58) Field of Classification Search
USPC ............................ 297/180.12, 180.11, 180.1
See application file for complete search history.

(56) References Cited

U.S. PATENT DOCUMENTS

| | | | | |
|---|---|---|---|---|
| 2,943,620 | A * | 7/1960 | Sibert | 601/18 |
| 4,459,471 | A * | 7/1984 | Hulett et al. | 219/527 |
| 5,516,189 | A * | 5/1996 | Ligeras | 297/180.11 |
| 6,596,018 | B2 * | 7/2003 | Endo et al. | 607/96 |
| 6,710,313 | B1 * | 3/2004 | Asami et al. | 219/549 |
| 6,733,072 | B2 * | 5/2004 | Jaillet et al. | 297/180.13 |
| 7,307,242 | B1 * | 12/2007 | Chen | 219/211 |
| 8,143,554 | B2 * | 3/2012 | Lofy | 219/202 |
| 2001/0020303 | A1 * | 9/2001 | Endo et al. | 5/421 |
| 2003/0111454 | A1 * | 6/2003 | Ishiyama et al. | 219/217 |
| 2004/0118831 | A1 * | 6/2004 | Martin | 219/494 |
| 2004/0194211 | A1 * | 10/2004 | Friedman | 5/421 |
| 2005/0121965 | A1 * | 6/2005 | Stowe | 297/452.42 |
| 2011/0156453 | A1 * | 6/2011 | Matsushima | 297/180.12 |

FOREIGN PATENT DOCUMENTS

| | | | |
|---|---|---|---|
| JP | 55-30070 U | 2/1980 | |
| JP | 05-293023 A | 11/1993 | |
| JP | 06-005352 A | 1/1994 | |
| JP | 2004-173821 A | 6/2004 | |
| WO | WO 2010137290 | * 12/2010 | ............... A47C 7/74 |

* cited by examiner

*Primary Examiner* — David E Allred
(74) *Attorney, Agent, or Firm* — Brinks Gilson & Lione

(57) ABSTRACT

A vehicle seat heater, which is to be fitted to a vehicle seat, includes a base sheet and a heater wire laid in the base sheet. The heater wire is laid in the base sheet so as not to orthogonally intersect its predicted wrinkle lines R. As a result, disconnections of the heater wire caused by repeated deformations of the vehicle seat heater can be suppressed.

1 Claim, 4 Drawing Sheets

VEHICLE SEAT HEATER

CROSS-REFERENCE TO RELATED APPLICATIONS

This application is a 371 application of PCT/JP2011/001331 having an international filing date of Mar. 7, 2011, the content of which is incorporated herein by reference.

TECHNICAL FIELD

The present invention relates to a vehicle seat heater to be fitted to a vehicle seat.

BACKGROUND ART

Conventionally, there has been known a vehicle seat heater which is placed between seat cover and seat pad (seat body) of an automobile or other vehicle seat to heat a person seated in the vehicle seat. As described in Patent document 1 as an example, the vehicle seat heater is formed by laying a heater wire in a base sheet having flexibility.

Patent Document 1: Japanese Laid-open Patent publication No. 2004-173821

SUMMARY OF INVENTION

Technical Problem

However, each time a person is seated in or released from the seat or each time the seated person is changed in posture, the vehicle seat heater is deformed. As particular portions of the vehicle seat heater are repeatedly deformed over and over, wrinkle lines occur in the base sheet while a heater wire laid at the particular portions undergoes repeated bending deformations. As a result of this, disconnections of the heater wire may occur. In particular, the more the wrinkle lines occur, the more the heater wire intersecting the occurring wrinkle lines increases, leading to a possibility of disconnections.

Accordingly, an object of the present invention is to provide a vehicle seat heater in which disconnections of the heater wire due to repeated deformations of the vehicle seat heater are suppressed.

Solution to Problem

In order to achieve the above object, the present invention has the following constitutions.

According to a first aspect of the present invention, there is provided A vehicle seat heater which is to be fitted to a vehicle seat, comprising: a base sheet; and a heater wire laid in the base sheet, wherein the heater wire is laid out so as not to orthogonally intersect a predicted wrinkle line of the base sheet.

Advantageous Effects of Invention

According to the present invention, in which the heater wire does not orthogonally intersect predicted wrinkle lines of the vehicle seat heater, even if actual wrinkle lines occur along predicted wrinkle lines, disconnections are less likely to occur at portions of the heater wire intersecting the actual wrinkle lines. Therefore, disconnections of the heater wire caused by repeated deformations of the vehicle seat heater can be suppressed.

DETAILED DESCRIPTION OF THE PREFERRED EMBODIMENTS

Figure 1:
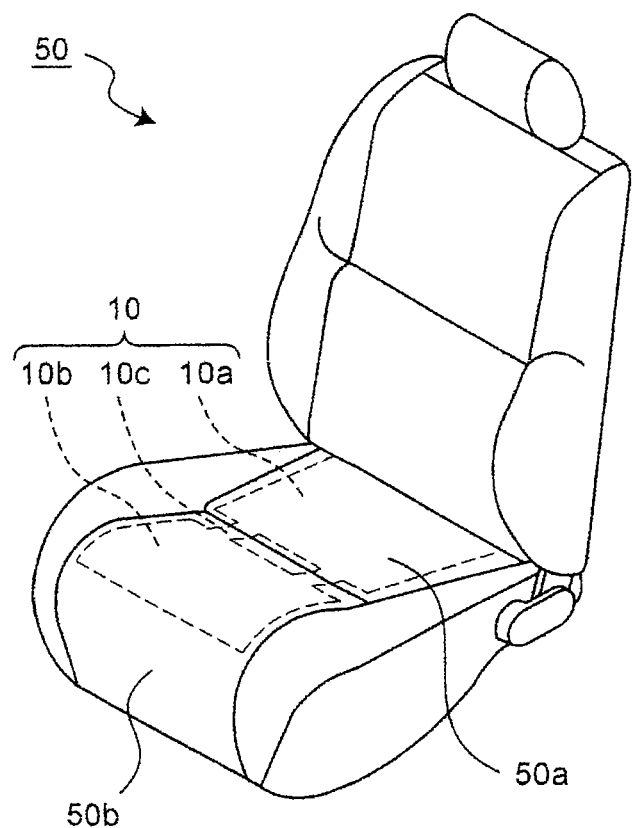
FIG. 1 is a perspective view of a vehicle seat equipped with a vehicle seat heater according to Embodiment 1 of the invention.

The present invention provides a vehicle seat heater which is to be fitted to a vehicle seat, comprising: a base sheet; and a heater wire laid in the base sheet, wherein the heater wire is laid so as not to orthogonally intersect a predicted wrinkle line of the base sheet.

According to this invention, in which the heater wire does not orthogonally intersect predicted wrinkle lines of the vehicle seat heater, even if actual wrinkle lines occur along predicted wrinkle lines, disconnections are less likely to occur at portions of the heater wire intersecting the actual wrinkle lines. Therefore, disconnections of the heater wire caused by repeated deformations of the vehicle seat heater can be suppressed.

Preferably, a portion of the vehicle seat heater where the predicted wrinkle line is present is made lower in rigidity than its surrounding portions. In this case, actual wrinkle lines are more likely to occur along the predicted wrinkle lines, so that the heater wire can be laid so as not to orthogonally intersect the predicted wrinkle lines.

Preferably, a portion of the vehicle seat heater where the predicted wrinkle line is present is positioned between two reinforcing sheets attached to the base sheet so as to be made lower in rigidity. In this case, actual wrinkle lines are more likely to occur along the predicted wrinkle lines, so that the heater wire can be laid so as not to orthogonally intersect the predicted wrinkle lines.

Also, cutouts or cuts-in may be formed at both ends of the predicted wrinkle line. In this case also, actual wrinkle lines are more likely to occur along the predicted wrinkle lines, so that the heater wire can be laid out so as not to orthogonally intersect the predicted wrinkle lines.

Furthermore, at a hanging portion of the vehicle seat heater which is inserted in a hanging groove of a seat pad of the vehicle seat heater, the predicted wrinkle line extending in a widthwise direction of the hanging portion is present, and in the hanging portion, the heater wire extends so as to meander in a direction orthogonal to the widthwise direction of the hanging portion. As a result, disconnections of the heater wire are suppressed in the hanging portions of the vehicle seat heater.

More specifically, preferably, in the hanging portion, the predicted wrinkle line passes through between succeeding two vertices of the meandering heater wire. As a result, disconnections of the heater wire are suppressed in the hanging portions of the vehicle seat heater.

Furthermore, the predicted wrinkle line may be present at a portion of the vehicle seat heater in contact with a corner of the hanging groove, and the portion of the vehicle seat heater in contact with the corner of the hanging groove may be made lower in rigidity than its surrounding portions. As a result, disconnections of the heater wire are suppressed in the portions of the vehicle seat heater in contact with the corner of the hanging groove.

Furthermore, in other cases, the predicted wrinkle line may be present at a portion of the vehicle seat heater in contact with a sewed portion of a seat cover of the vehicle seat, and the portion of the vehicle seat heater in contact with the sewed portion of the seat cover may be made lower in rigidity than its surrounding portions. As a result, disconnections of the heater wire are suppressed in the portions of the vehicle seat heater in contact with the sewed portions of the seat cover.

Hereinbelow, embodiments of the present invention will be described with reference to the accompanying drawings. It is noted that the present invention is not limited by the following embodiments.

Embodiment 1

Figure 2:
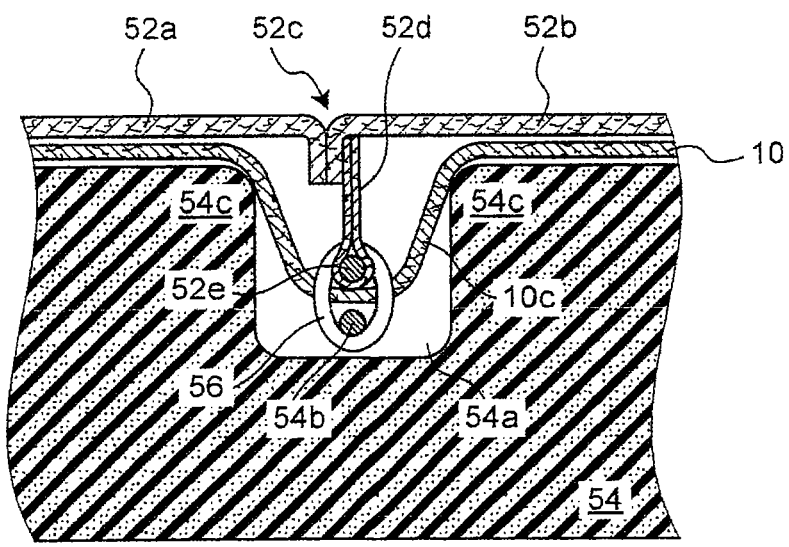
FIG. 2 is a partial sectional view of the vehicle seat shown in FIG. 1.
Figure 3:
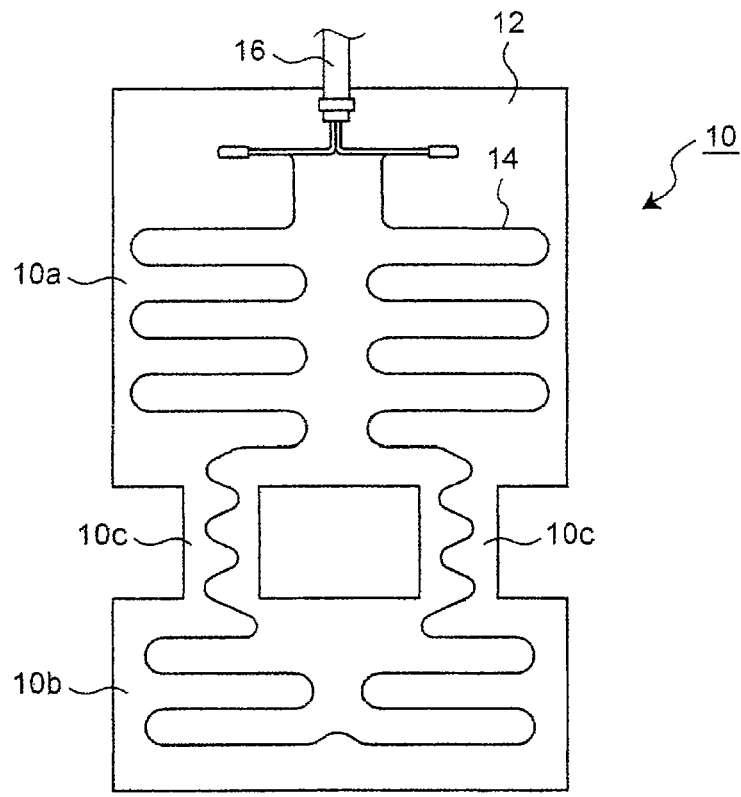
FIG. 3 is a view showing the vehicle seat heater shown in FIG. 1.

FIG. 1 shows a vehicle seat equipped with a vehicle seat heater according to Embodiment 1 of the invention. FIG. 2 is a partial sectional view of the vehicle seat of FIG. 1. FIG. 3 shows the vehicle seat heater.

As shown in FIGS. 1 and 2, a vehicle seat 50 has seat covers 52a, 52b made from, for example, artificial leather or the like, and a seat pad (seat body) 54 made from, for example, urethane foam or the like. A vehicle seat heater 10 is placed between the seat covers 52a, 52b and the seat pad 54. Also, the vehicle seat heater 10 is placed so as to extend from a central portion 50a of the vehicle seat 50 for supporting human buttocks to a front portion 50b for supporting thighs. It is noted that shapes of the central portion 50a and the front portion 50b are not limited to those of FIG. 1.

As shown in FIG. 3, the vehicle seat heater 10 has a base sheet 12, a heater wire 14 laid in the base sheet 12, and a harness 16 for feeding electric power to the heater wire 14.

The vehicle seat heater 10 also has a first warming portion 10a placed in the central portion 50a of the vehicle seat 50, a second warming portion 10b placed in the front portion 50b, and a plurality of hanging portions 10c for coupling the first warming portion 10a and the second warming portion 10b to each other.

Further, the vehicle seat heater 10, as shown in FIG. 2, is fixed to the seat pad 54 by the hanging portions 10c being inserted in hanging groove 54a formed in the seat pad 54.

More specifically, a hanging bag 52d is provided near a sewed portion 52c of the seat covers 52a, 52b located upward of the hanging groove 54a. Accommodated in the hang-in bag 52d is a cover-side hanging wire 52e extending generally parallel to the hanging groove 54a. This cover-side hanging wire 52e is fixed via a retainer ring 56 to a pad-side hanging wire 54b fixed within the hanging groove 54a. Each hanging portion 10c of the vehicle seat heater 10 is hung on such a cover-side hanging wire 52e so as to be fixed to the seat pad 54.

The base sheet 12 of the vehicle seat heater 10 is made from, for example, nonwoven fabric or urethane sheet.

The heater wire 14 of the vehicle seat heater 10, which is a metal wire as an example, is sewed to the base sheet 12 by thread (not shown). Alternatively, the heater wire 14 may also be sewed into the base sheet 12 like thread or bonded thereto by thermal fusion or the like, where the means for fixation of the heater wire 14 is not limited to the above-described one.

Also, the heater wire 14 extends from the harness 16, which is attached at the first warming portion 10a, and passes through one hanging portions 10c toward the second warming portion 10b, and further turns over at the second warming portion 10b to passes through the other hanging portions 10c, extending toward the harness 16 of the first warming portion 10a.

Figure 4:
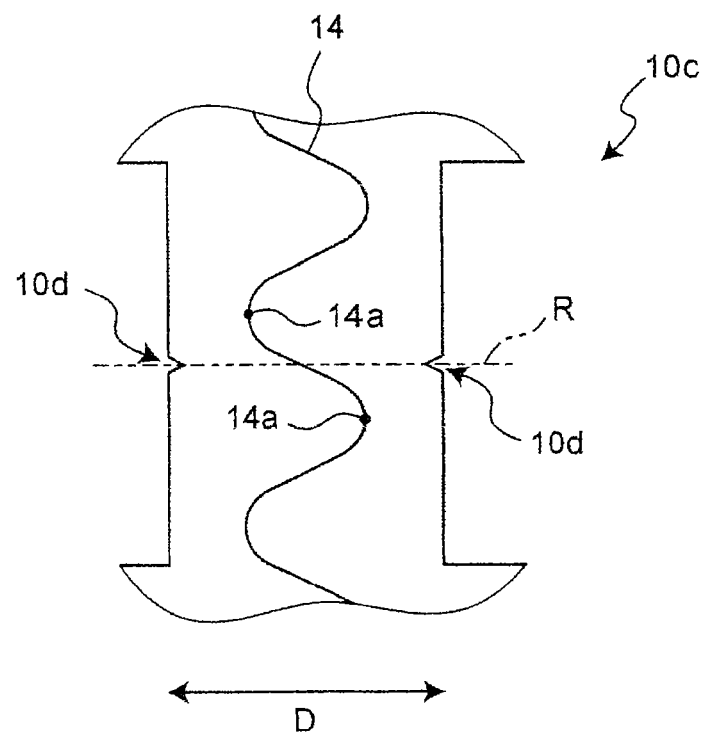
FIG. 4 is an enlarged view of a hanging portion of the vehicle seat heater shown in FIG. 3.

With regard to such a heater wire 14, as shown in FIG. 4, which is an enlarged view of the hanging portion 10c, the heater wire 14 is not orthogonal to a wrinkle line R. The heater wire 14 intersects the wrinkle line R at an angle other than 90 degrees. It is noted that this wrinkle line R is empirically or theoretically determined, showing a wrinkle line of the vehicle seat heater 10 the occurrence of which in the future is predicted (hereinafter, referred to as "predicted wrinkle line").

In the hanging portion 10c of the vehicle seat heater 10, a wrinkle line extending in its widthwise direction (i.e., a lengthwise direction of the hanging groove 54a) D tends to occur, like the predicted wrinkle line R. That is, the hanging portion 10c tends to undergo such deformations as to cause wrinkle lines extending in the widthwise direction D to occur.

In more detail, as shown in FIG. 2, the hang-in portion 10c of the vehicle seat heater 10 is hung on the cover-side hanging wire 52e under tension, so that the tension changes each time a person is seated in or released from the seat or each time the posture of a seated person is changed. By those changes of the tension, the hanging portion 10c is repeatedly subjected to bending deformations, i.e. bending at the predicted wrinkle lines R, so that actual wrinkle lines occur along the predicted wrinkle lines R.

Therefore, with the heater wire 14 orthogonally intersecting the predicted wrinkle line R extending in the widthwise direction D of the hanging portion 10c, repeated bending stress occurs at portions of the heater wire 14 intersecting the predicted wrinkle lines R, causing a possibility that disconnections occur at those portions. As a countermeasure for this, the heater wire 14 is provided so as not to orthogonally intersect the wrinkle lines R.

In addition, even if the heater wire 14 does not orthogonally intersect the predicted wrinkle lines R, bending of the hanging portion 10c at the predicted wrinkle line R causes bending stress to occur at the portions of the heater wire 14 intersecting the predicted wrinkle lines R. However, the bending stress is smaller, as compared with the bending stress that occurs when the heater wire 14 orthogonally intersects the predicted wrinkle lines R.

As to the reason of this, when the heater wire 14 does not orthogonally intersect the predicted wrinkle lines R, the heater wire 14, which is sewed to the base sheet 12 by thread (or stitched into the base sheet 12 like thread), is allowed to minutely twist upon bending of the hanging portions 10c at the predicted wrinkle lines R. As a result of this, the bending stress at the portions of the heater wire 14 intersecting the predicted wrinkle lines R is relaxed, so that disconnections of the portions of the heater wire 14 intersecting the predicted wrinkle lines R are suppressed.

Concretely, as shown in FIG. 4, the heater wire 14 is set at the hanging portion 10c so as to meander in a wavy shape (e.g., sine-curve shape) and extend in a direction orthogonal to the widthwise direction D of the hanging portion 10c (i.e., in a direction from the first warming portion 10a toward the second warming portion 10b). As a result of this, the heater wire 14 does not orthogonally intersect the predicted wrinkle lines R. In addition, preferably, the wavy-shaped heater wire 14 is provided at the hanging portion 10c so that the predicted wrinkle line R does not pass through a vertex 14a of the wavy-shaped heater wire 14, especially so that the predicted wrinkle line R passes through a midpoint of succeeding two vertices 14a of the wavy-shaped heater wire 14.

Figure 5:
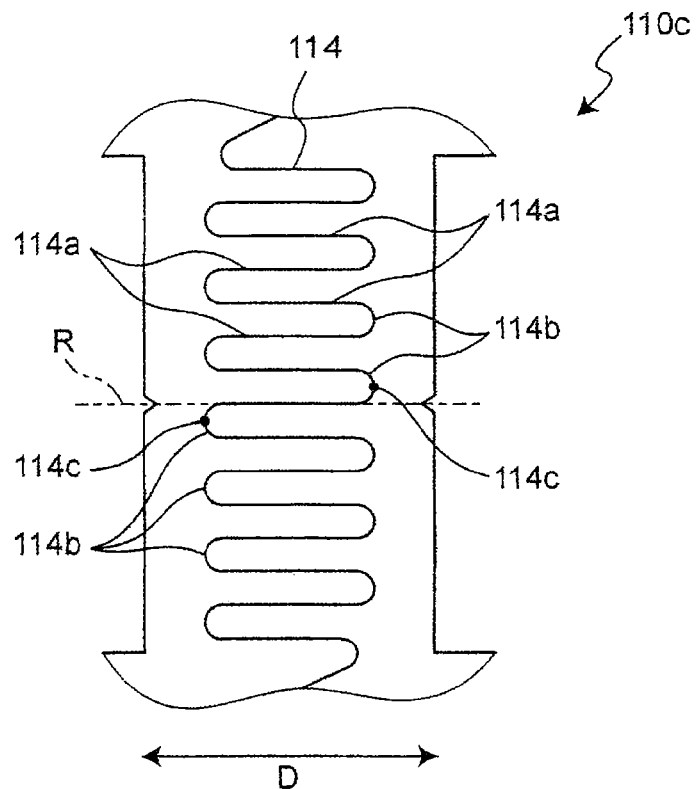
FIG. 5 is an enlarged view of a hanging portion of a vehicle seat heater according to an modification of Embodiment 1.

Also, for example as shown in FIG. 5, which is an enlarged view of a hanging portion 110c of a vehicle seat heater according to a modification of this embodiment, a heater wire 114 may be provided at the hanging portion 110c in a comb-tooth like meandering shape. This comb-tooth like heater wire 114 is formed by connecting linear portions 114a, which extend in the widthwise direction D of the hanging portion 110c, and circular-arc portions 114b alternately. In addition, preferably, the comb-tooth like heater wire 114 is provided at the hanging portion 110c so that the predicted wrinkle line R does not pass through a vertex 114c of the circular-arc portion 114b of the comb-tooth like heater wire 114, especially so that the predicted wrinkle line R passes through a midpoint of succeeding two vertices 114c of the comb-tooth like heater wire 114 (i.e., passes through the heater wire 114 generally in parallel with the linear portion 114a).

Preferably, as shown in FIG. 4, cutouts 10d are formed at both ends of the predicted wrinkle line R so that actual wrinkle lines occur along the predicted wrinkle lines R. Instead of the cutouts 10d, cuts-in may be formed. As a result of this, a portion of the hanging portion 10c positioned between two cutouts 10d becomes lower in rigidity to bending deformation, as compared with its surrounding portions. Consequently, bending deformation of the hanging portion 10c bent at the predicted wrinkle line R is more likely to occur such that an actual wrinkle line occurs along the line connecting the two cutouts 10d together, i.e., along the predicted wrinkle line R.

According to this embodiment, the heater wire 14 does not orthogonally intersect the predicted wrinkle lines R of the vehicle seat heater 10. Therefore, even if actual wrinkle lines occur along the predicted wrinkle lines R, disconnections are less likely to occur at the portions of the heater wire 14 intersecting the actual wrinkle lines. Thus, disconnections of the heater wire 14 caused by repeated deformations of the vehicle seat heater 10 can be suppressed.

Embodiment 2

This Embodiment 2 is similar to the above-described Embodiment 1 except the hanging portion of the vehicle seat heater. Therefore, the hanging portion only is described below.

Figure 6:
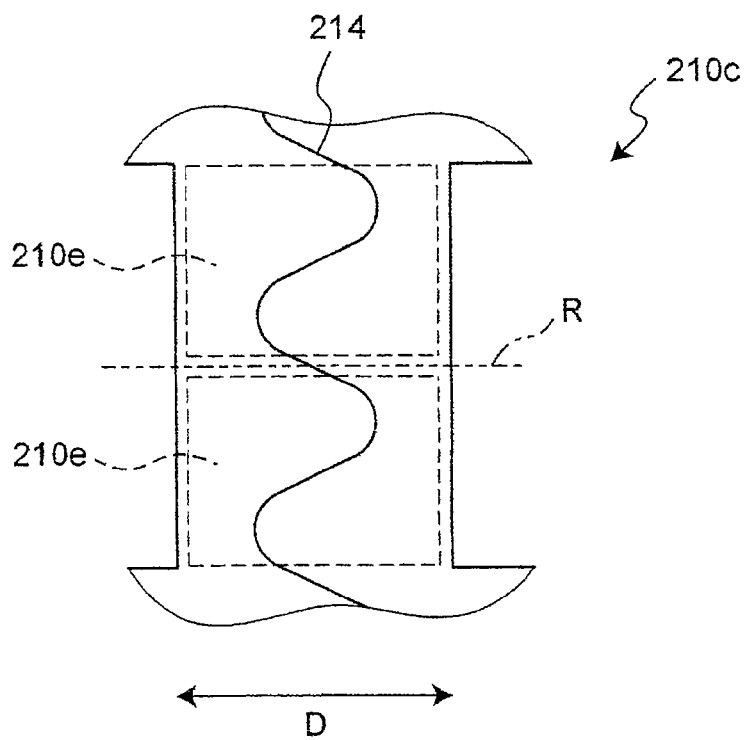
FIG. 6 is an enlarged view of a hanging portion of a vehicle seat heater according to Embodiment 2 of the invention.

FIG. 6 shows a hanging portion of the seat heater according to this Embodiment 2. As shown in FIG. 6, two reinforcing sheets 210e are attached in a hanging portion 210c with a predicted wrinkle line R sandwiched therebetween. As a result of this, a portion of the hanging portion 210c where the predicted wrinkle lines R is present, i.e., a portion between the two reinforcing sheets 210e is made lower in rigidity, as compared with its surrounding portions. Thus, bending deformation of the hanging portion 210c bent at the predicted wrinkle line R is more likely to occur such that an actual wrinkle line occurs along the predicted wrinkle lines R. In addition, the reinforcing sheets 210e may be attached on one surface of the hanging portion 210c on which a heater wire 214 is provided or on its opposite-side surface, and moreover attached on both sides.

The present invention has been described by way of embodiments above. However, the invention is not limited to the above embodiments.

For example, for vehicle seat heaters, wrinkle lines may occur also at portions other than the hanging portions. For example, as shown in FIG. 2, a corner 54c of the hanging groove 54a of the seat pad 54 is liable to change due to seating or releasing of the seat or postural changes during the seating. As a result of changes in the corner 54c, a portion of the vehicle seat heater 10 in contact with the corner 54c may be deformed, so that wrinkle lines may occur to the portion.

In this case also, as with the hanging portion 10c, a predicted wrinkle line at the portion of the vehicle seat heater 10 in contact with the corner 54c of the hanging groove 54a of the seat pad 54 is empirically or theoretically determined. Then, the heater wire 14 is laid in the base sheet 12 so that the heater wire 14 does not orthogonally intersect the determined predicted wrinkle line. As a result of this, disconnections of the heater wire 14 can be suppressed at portions of the vehicle seat heater 10 in contact with the corner 54c of the hanging groove 54a. Further, the portions of the vehicle seat heater 10 in contact with the corner 54c may be made lower in rigidity than in its surrounding portions, by forming cutouts (or cuts-in) (see FIG. 4), as with the predicted wrinkle lines R of the hanging portions, or by using reinforcing sheets (see FIG. 6), so that actual wrinkle lines occur along the predicted wrinkle lines at the portions of the vehicle seat heater 10 in contact with the corner 54c of the hanging groove 54a.

Figure 7:
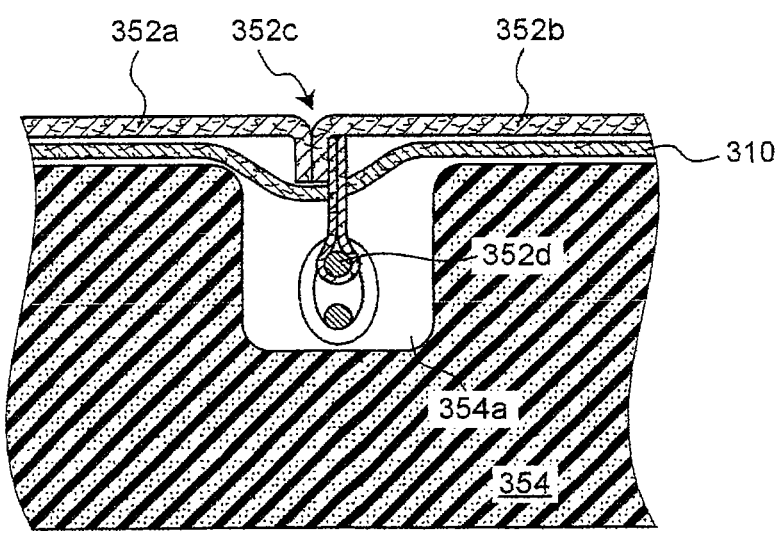
FIG. 7 is a partial sectional view of a vehicle seat equipped with a vehicle seat heater according to another Embodiment of the invention.

Moreover, in a case where, as shown in FIG. 7 unlike the above embodiments, a vehicle seat heater 310 is not hung on a cover-side hanging wire 352d but passed above a hanging groove 354a of a seat pad 354 (e.g., in a case where the vehicle seat heater 310 is fixed to seat covers 352a, 352b or the seat pad 354 via a Hook-and-Loop fastener), wrinkles are more likely to occur at portions of the vehicle seat heater 310 in contact with a sewed portion 352c of the seat covers 352a, 352b. In this case also, predicted wrinkle lines are determined as in the foregoing embodiments, and a heater wire is laid in the base sheet so that the heater wire does not orthogonally intersect the determined predicted wrinkle lines. As a result of this, disconnections of the heater wire can be suppressed at portions of the vehicle seat heater 310 in contact with the sewed portion 352c of the seat covers 352a, 352b. Further, the portions of the vehicle seat heater 310 in contact with the sewed portion 352c may be made lower in rigidity than in its surrounding portions, by forming cutouts (or cuts-in) (see FIG. 4), as with the predicted wrinkle lines R of the hanging portions, or by using reinforcing sheets (see FIG. 6), so that actual wrinkle lines occur along the predicted wrinkle lines at the portions of the vehicle seat heater 310 in contact with the sewed portion 352c.

As shown above, in the present invention, in wider sense, the heater wire is laid in the base sheet so that the heater wire does not orthogonally intersect the predicted wrinkle lines regardless of which portion of the vehicle seat heater.

Although the present invention has been fully described in connection with the preferred embodiments thereof with reference to the accompanying drawing, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

The vehicle seat heater according to the present invention may be provided not only in the central portion 50a or the front portion 50b of the vehicle seat 50 shown in FIG. 1, but also in the backrest portion that supports the human back, only if predicted wrinkle lines can be determined empirically or theoretically.

The invention claimed is:
1. A vehicle seat heater which is to be fitted to a vehicle seat, comprising:
- a base sheet having a first portion, a second portion, and a third portion, the first portion and the third portion arranged in a front-back direction of the vehicle seat, the second portion defined by a bridge between the first portion and the third portion, the bridge having a maximum widthwise dimension less than a width of the first and third portions; and
- a heater wire laid in the base sheet, wherein
- the heater wire is laid in the second portion of the base sheet so as not to orthogonally intersect a widthwise line of the second portion of the base sheet extending in a direction orthogonal to the front-back direction, and
- a portion of the vehicle seat heater where the widthwise line is present is positioned between two reinforcing sheets in the second portion attached to the base sheet, thereby making it lower in rigidity than its surrounding portions.

* * * * *